United States Patent
Harrow et al.

(10) Patent No.: US 11,887,120 B2
(45) Date of Patent: Jan. 30, 2024

(54) SYSTEM AND METHOD FOR TOUCHLESS PIN ENTRY

(71) Applicant: NCR Corporation, Duluth, GA (US)

(72) Inventors: Charles Harrow, Scotland (GB); Robert White, Scotland (GB)

(73) Assignee: NCR Atleos Corporation, Atlanta, GA (US)

( * ) Notice: Subject to any disclaimer, the term of this patent is extended or adjusted under 35 U.S.C. 154(b) by 160 days.

(21) Appl. No.: 17/030,835

(22) Filed: Sep. 24, 2020

(65) Prior Publication Data

US 2022/0092598 A1    Mar. 24, 2022

(51) Int. Cl.
*G06Q 20/40* (2012.01)
*G06Q 20/18* (2012.01)
*G06Q 20/10* (2012.01)

(52) U.S. Cl.
CPC ..... *G06Q 20/4012* (2013.01); *G06Q 20/1085* (2013.01); *G06Q 20/18* (2013.01)

(58) Field of Classification Search
CPC ........... G06Q 20/4012; G06Q 20/1085; G06Q 20/18; G06Q 20/3223; G06Q 20/3278;
(Continued)

(56) References Cited

U.S. PATENT DOCUMENTS 7,175,073 B2   2/2007   Kelley et al.
7,711,643 B2   5/2010   Nielsen
(Continued)

FOREIGN PATENT DOCUMENTS

JP   2002-344438   11/2002
JP   2009-042954   2/2009
(Continued)

OTHER PUBLICATIONS

"Analysis of Applicability of ISO 9564 PIN based Authentication to Closed-Loop Mobile Payment System", Amal Saha, Int. J. Advanced Networking and Applications, vol. 6 Issue 2, pp. 2285-2290 (Year: 2014).*
(Continued)

*Primary Examiner* — Duan Zhang
(74) *Attorney, Agent, or Firm* — Notaro, Michalos & Zaccaria P.C.; John S. Economou (57) ABSTRACT

A system and method is described for the touchless entry of a personal identification number (PIN) at a self-service terminal such as an automated teller machine (ATM). A mobile device includes a PIN entry application. The self-service terminal includes a wireless interface for communicating wirelessly with the PIN entry application in the mobile device. A communication channel is established between a particular customer's mobile device and the self-service terminal. The PIN entry application verifies a public key for the self-service terminal at the mobile device. The customer's PIN is encrypted by the PIN entry application at the mobile device using either an ephemeral symmetric encryption key or a one-time RSA PIN transport public key. The encrypted PIN is transmitted to an encryption processor at the self-service terminal. The encryption processor decrypts the PIN using the appropriate encryption key.

20 Claims, 6 Drawing Sheets

(58) Field of Classification Search
CPC ...... G07F 7/1025; G07F 7/1091; G07F 19/20; G07F 19/201; G07F 19/2055; G07F 7/1033
See application file for complete search history.

(56) References Cited

U.S. PATENT DOCUMENTS

| | | | |
|---|---|---|---|
| 8,632,000 | B2 | 1/2014 | Laracey |
| 8,924,712 | B2 | 12/2014 | Varadarajan et al. |
| 10,430,779 | B2 | 10/2019 | Iqbal et al. |
| 10,467,604 | B1 | 11/2019 | Dorsch et al. |
| 10,475,009 | B2 | 11/2019 | Recriwal et al. |
| 10,521,814 | B1* | 12/2019 | Collins .............. G06Q 20/4012 |
| 10,535,047 | B1 | 1/2020 | Thomas et al. |
| 10,614,442 | B2 | 4/2020 | Gupta et al. |
| 10,706,400 | B1 | 7/2020 | Puffer et al. |
| 10,922,631 | B1* | 2/2021 | Shahidzadeh ......... H04W 4/029 |
| 2006/0093138 | A1* | 5/2006 | Durand ................ H04L 9/0844 380/44 |
| 2006/0189382 | A1* | 8/2006 | Muir ..................... G07F 17/32 463/29 |
| 2016/0027006 | A1* | 1/2016 | Billett, Jr. ............ H04W 12/04 705/71 |
| 2018/0262339 | A1* | 9/2018 | Kazin ...................... H04L 9/14 |
| 2019/0019144 | A1* | 1/2019 | Gillen .................. H04L 9/3213 |
| 2019/0034900 | A1* | 1/2019 | Lo ...................... G06Q 20/204 |
| 2020/0013051 | A1* | 1/2020 | Kadiwala ............. H04L 63/068 |
| 2020/0021567 | A1* | 1/2020 | Salgaonkar .............. H04L 9/14 |

FOREIGN PATENT DOCUMENTS

| | | | | |
|---|---|---|---|---|
| JP | 2014-045233 | | 3/2014 | |
| WO | WO-2004091170 | A2 * | 10/2004 | ............ G06F 21/31 |
| WO | WO-2007099608 | A1 * | 9/2007 | ........... H04L 9/3263 |
| WO | WO-2010114799 | A1 * | 10/2010 | ........... G06Q 20/027 |

OTHER PUBLICATIONS

EP Search Report dated Aug. 17, 2021.
JP Office Action dated May 12, 2022 and English-language machine translation thereof.

* cited by examiner

SYSTEM AND METHOD FOR TOUCHLESS PIN ENTRY

FIELD

This disclosure relates generally to an improved system and method for touchless entry of a Personal Identification Number (PIN) code at a self-service terminal.

BACKGROUND

Unattended PIN entry devices (PEDs) typically include an encrypting keypad to allow a customer to enter a PIN code in a secure manner. Such a keypad is known in the art as an Encrypting PIN pad (or EPP) and may include only a secure keypad as a customer interface and rely upon external displays and card readers of the PED. The Encrypting PIN Pad is an apparatus which encrypts an identifier such as a PIN entered on a keypad to ensure that the unencrypted PIN is not stored or transmitted anywhere in the rest of the system and thus cannot be revealed accidentally or through manipulations of the system.

PEDs are commonly included in Self-Service Terminal (SSTs), such as Automated Teller Machines (ATMs), automated fuel dispensers, kiosks and vending machines, etc. An ATM typically requires a customer to enter a secure PIN code via an EPP in the ATM for authorizing a customer transaction at the ATM. In some cases the EPP may constitute a separate physical keypad provided for PIN entry while in other cases the EPP may be provided by way of an encrypting touchscreen (ETS) which provides a simulated keypad as part of the display on the touchscreen.

One drawback in the use of the PEDs included on SSTs is that each customer must manually touch exterior surfaces of the keypad in order to enter their PIN code. Such keypad surfaces are exposed to the local environment and could possibly carry pathogens such as viruses. This can make customers reluctant to use SSTs during periods when the transmissivity of viruses is particularly high, such as during flu season or a pandemic.

Another drawback is that visually impaired customers may have difficulty in entering their PIN code using an SST in which a separate keypad is not provided and instead the keypad is simulated on a touchscreen.

Accordingly, there is a need for a touchless PIN entry system and method which overcomes the drawbacks identified above.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
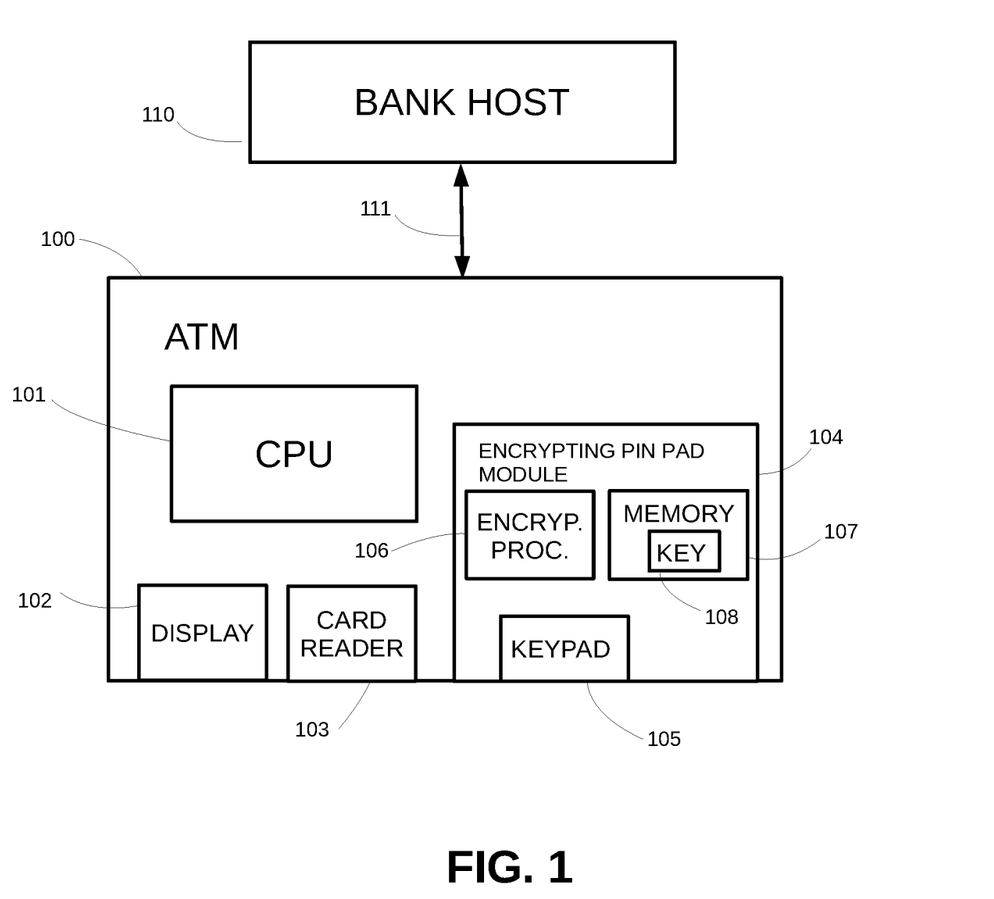
FIG. 1 is a block diagram of a conventional automatic teller machine coupled to a bank host computer that requires manual PIN entry.

Referring now to FIG. 1, a conventional ATM 100 is shown coupled to a remote bank host 110 via a private network 111. Typically a plurality of ATMs 100 are coupled to the remote bank host 110 via to the private network 111 to form an ATM network for a particular bank. Each ATM 100 includes a central processing unit (CPU) 101, a display 102, a card reader 103, and an encrypting PIN pad module 104. The card reader 103 may require physical contact with a customer's bank card to read customer information including, inter alia, the customer's primary account number (PAN), or may have a contactless mode using, for example, radio frequency identification (RFID) or near field communications (NFC), for reading such information. The encrypting PIN pad module 104 is an encrypting PIN pad and includes a keypad 105, an encryption processor 106, and a memory 107 holding a symmetric encryption key 108. The encrypting PIN pad module 104 obtains the customer's PIN via manual entries by the customer on keypad 105 in response to instructions provided on display 102—requiring the customer to physically contact the keypad 105 in order to enter the PIN. In some cases, a separate EPP module may be omitted and display 102 may be an ETS that receives the PIN from the customer upon prompts provided on display 102. The encrypting PIN pad module 104 also receives the customer's primary account number (PAN) via CPU 101 and card reader 103. The encryption key 108 is a symmetric PIN encryption key for the bank. The encrypting PIN pad module 104 is a secure device (e.g., a tamper resistant security module) and is the only device within an ATM which that the remote bank host 110 trusts to hold the symmetric encryption key 108 and to generate a PIN block, i.e., an encrypted message including both the customer's PIN and PAN. The encryption processor 106 in encrypting PIN pad module 104 generates a PIN block upon receipt of the customer's PIN and PAN using encryption key 108. The encrypted PIN block is forwarded, via CPU 101, to the remote bank host 110 for approval. Because the symmetric encryption key 108 is used to encrypt a customer's PIN and PAN, it must be maintained secure and cannot ever be duplicated outside encrypting PIN pad module 104 in ATM 100. Encrypting PIN pad module 104 is designed to be a tamper resistant security module. The security features applied to encrypting PIN pad module 104 ensure that it is not possible to eavesdrop on the PIN entry process through any electronic means whatsoever. ATM 100 provides a secure login process for each customer, but requires that the customer physically contact the keypad 105 or the display 102 (when display 102 is a touchscreen-type display that generates a simulated keypad) in order to enter their PIN.

Figure 2A:
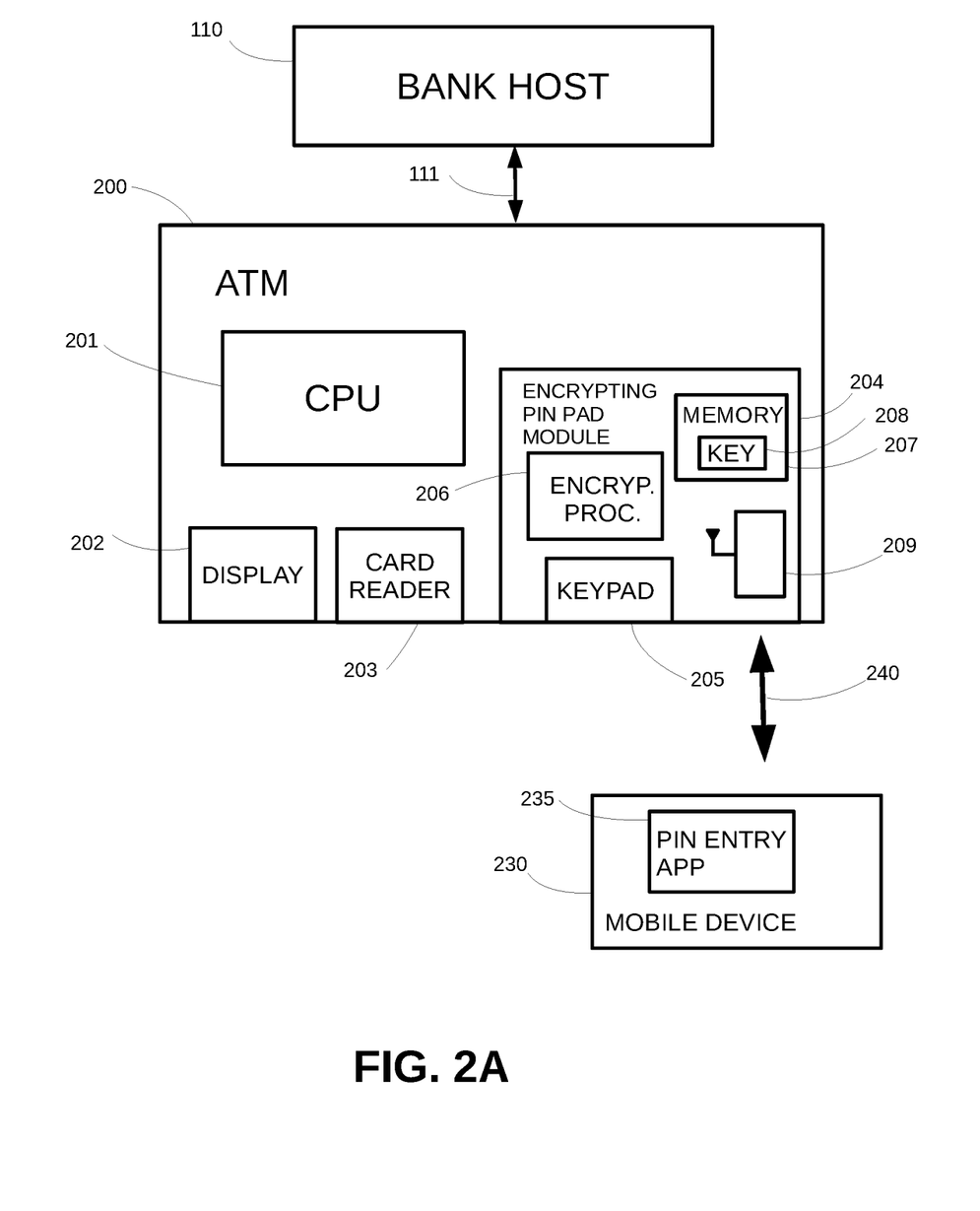
FIG. 2A is a block diagram of one embodiment of a system for touchless PIN entry via a mobile device coupled wirelessly to an automatic teller machine that is also coupled to a bank host computer.
Figure 2B:
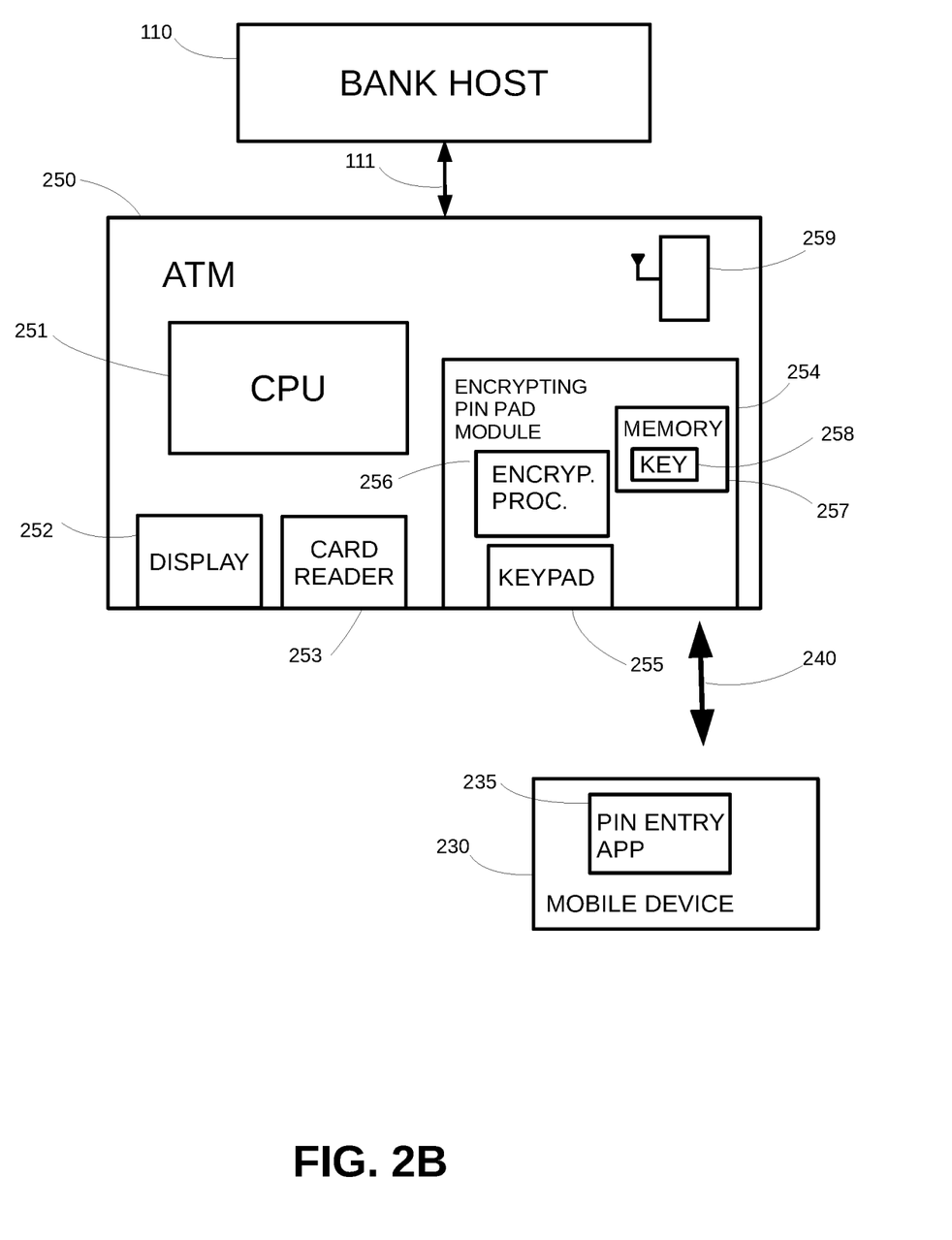
FIG. 2B is a block diagram of an alternative embodiment of a system for touchless PIN entry via a mobile device coupled wirelessly to an automatic teller machine that is also coupled to a bank host computer.

Referring now to FIGS. 2A and 2B, two embodiments of a system for touchless PIN entry via a mobile device coupled wirelessly to an automatic teller machine are shown.

In the embodiment shown in FIG. 2A, the ATM 100 of FIG. 1 is modified to provide a wireless communication channel 240 with a mobile device 230 including a PIN entry application (mobile app) 235 via a wireless interface 209 added to encrypting PIN pad module 204. PIN entry application 235 includes a stored CA digital certificate (including the public key) for use in asymmetric encrypted communication with ATMs associated with the bank owning ATM 200. Encrypting PIN pad module 204 includes a corresponding CA digital certificate which may be either injected into encrypting PIN pad module 204 during the manufacturing process or generated within encrypting PIN pad module 204 after deployment thereof. In the latter case, the CA digital certificate is preferably signed with a private key injected into encrypting PIN pad module 204 during the manufacturing process. PIN entry application 235 is used to enter and optionally store the customer's PIN. In order to maintain security, PIN entry application 235 never receives or stores the customer's PAN. ATM 200 includes a central processing unit (CPU) 201, a display 202, a card reader 203, and encrypting PIN pad module 204. Display 202 and card reader 203 correspond, respectively, to display 102 and card reader 103 in FIG. 1. Encrypting PIN pad module 204 includes a keypad 205, an encryption processor 206, a memory 207 holding an encryption key 208, and a wireless interface 209. Keypad 205 corresponds to keypad 105 in FIG. 1. Wireless interface 209 is adapted to communicate via one or more of a local Wi-Fi channel (IEEE 802.11), a Bluetooth wireless channel, or a near field communication (NFC) channel.

In the embodiment shown in FIG. 2B, the ATM 100 of FIG. 1 is modified to provide a wireless communication channel 240 with a mobile device 230 including a PIN entry application 235 via a wireless interface 259 coupled to CPU 251 in ATM 250. ATM 250 includes a central processing unit (CPU) 251, a display 252, a card reader 253, encrypting PIN pad module 254, and wireless interface 259. Display 252 and card reader 253 correspond, respectively, to display 102 and card reader 103 in FIG. 1. Encrypting PIN pad module 254 includes a keypad 255, an encryption processor 256, a memory 257 holding an encryption key 258. Encrypting PIN pad module 254 includes a corresponding CA digital certificate which may be either injected into encrypting PIN pad module 254 during the manufacturing process or generated within encrypting PIN pad module 254 after deployment thereof. In the latter case, the CA digital certificate is preferably signed with a private key injected into encrypting PIN pad module 254 during the manufacturing process. Keypad 255 corresponds to keypad 105 in FIG. 1. Wireless interface 259 may communicate via one or more of a local Wi-Fi channel (IEEE 802.11), a Bluetooth wireless channel, or a near field communication (NFC) channel.

Figure 3:
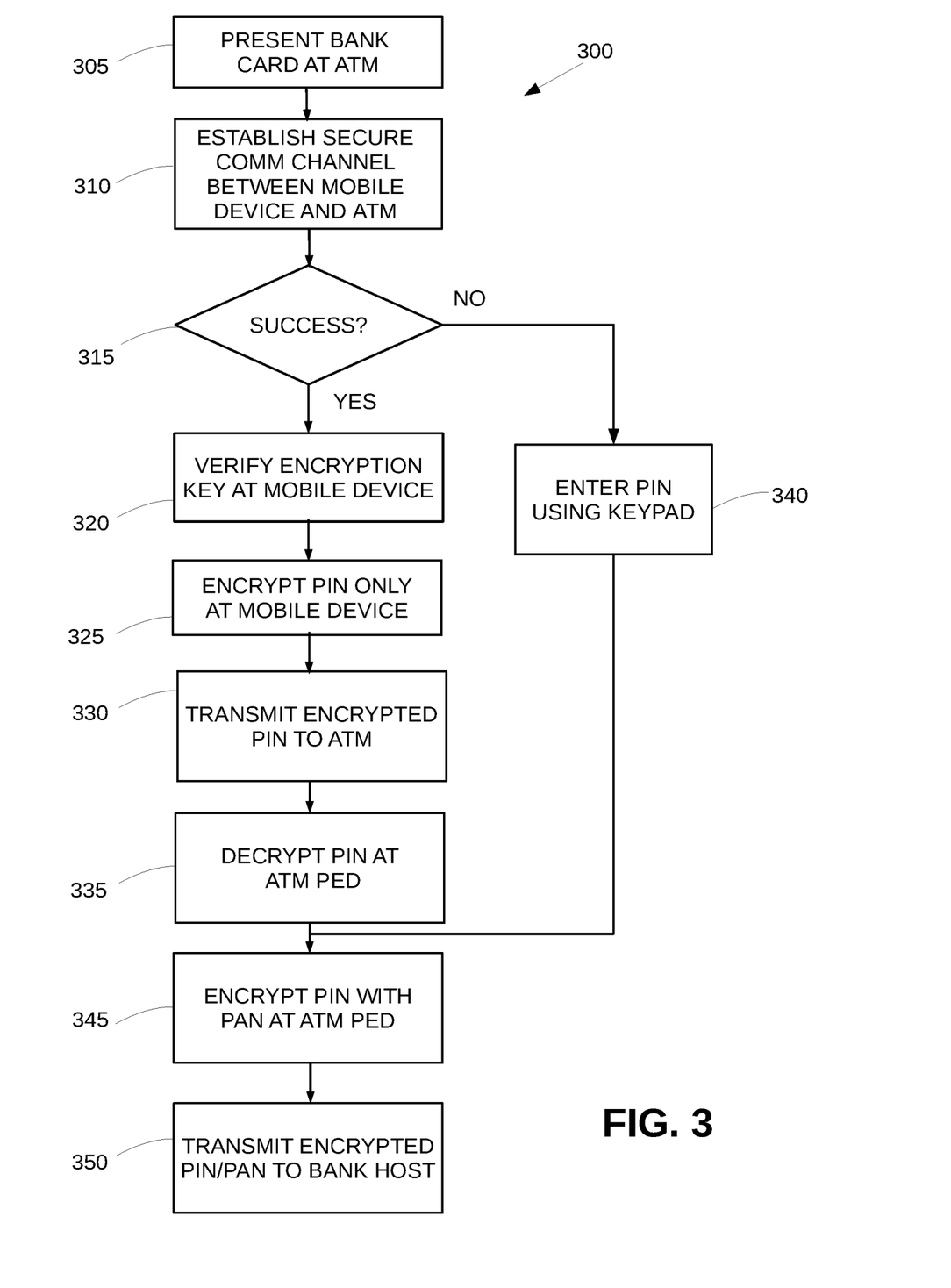
FIG. 3 is a flowchart showing a method of operation of the system shown in FIGS. 2A and 2B.

Referring now to FIG. 3, a flowchart 300 is shown which describes the operation of the embodiments shown in FIGS. 2A and 2B. A customer wishing to use the ATM 200, 250 to conduct banking business first presents their bank card (e.g., a contactless EMV card) to the card reader 203, 253 at step 305. This may be done conventionally, by sliding the bank card into a slot in card reader 203, 253, or by using a contactless mode based on, for example, a bank card including a radio frequency identification (RFID) tag or a near field communications (NFC) interface. In this manner, CPU 201, 251 obtains the customer's PAN and forwards it to encryption processor 206, 256 within encrypting PIN pad module 204, 254.

Next, at step 310, ATM 200, 250 attempts to establish a wireless communication channel 240 with the customer's mobile device 230. The customer opens the PIN entry application 235 on their mobile device 230. In one version, ATM 200, 250 causes wireless interface 209, 259 to scan for a PIN entry application 235 that is open on a nearby mobile device 230 once the bank card is presented and to establish a communication channel with that mobile device 230 when an open PIN entry application 235 is found. When no open PIN entry application 235 is found on a nearby mobile device 230 and no communication channel can be established, processing proceeds via decision box 315 to step 340 and ATM 200, 250 reverts to standard PIN entry using keypad 205, 255. In another version, PIN entry application 235 initiates contact with ATM 200, 250 in order to establish the communication channel. Once a wireless connection is established between mobile device 230 and ATM 200, 250, ATM 200, 250 may request identifying information, e.g., a phone ID and bank card nickname ("Bob's Phone"), from the PIN entry application 235. Upon receipt of such information from PIN entry application 235, the ATM 200, 250 preferably provides an indication on display 202 that a connection has been established with a mobile device 230 having the received identifying information (e.g., "Connected to Bob's Phone"). The ATM 200, 250 preferably also provides status information and/or instructions on display 202. PIN entry application 235 may store the customer's PIN and be set to automatically provide the PIN upon request to ATM 200, 250. In this case, ATM 200, 250 may provide a status display stating "Getting PIN for Bank X Debit Card." In addition, PIN entry application 235 may have a lock mode which requires the customer to unlock the mobile device 230 before the customer can enter the PIN so that PIN entry application 235 can transmit the entered PIN to ATM 200, 250. If the PIN entry application 235 is set to this mode, ATM 200, 250 may provide a status display stating "Unlock mobile device to enter PIN for Bank X Debit Card." Further, PIN entry application 235 may have an input always mode which requires the customer to enter the PIN via the mobile device 230 upon each use. If the PIN entry application 235 is set to this mode, ATM 200, 250 may provide a status display stating "Enter PIN for Bank X Debit Card." Once this step is complete, the customer's pin will be stored in a temporary memory in mobile device 230 for further processing. This is accomplished by either moving a stored version of the PIN to the temporary memory or by storing the PIN in the temporary memory after manual entry by the customer via the mobile device 230 (e.g., in response to prompts such as those recited above).

Next, at step 320, mobile device 230 verifies the ATM's CA digital certificate (which includes the ATM public key). This is done by receiving an ATM CA digital certificate (public key) from the ATM 200, 250 and using a CA digital certificate received from the same certificate authority and previously stored in PIN entry application 235 to verify that the received ATM CA digital certificate is genuine. ATM 200, 250 may initiate transmission of the ATM CA digital certificate to mobile device 230. Alternatively, mobile device 230 may initiate transmission by issuing a request to ATM 200, 250 for transmission of the ATM CA digital certificate from ATM 200, 250 to mobile device 230. In a further embodiment, ATM 200, 250 may sign certain identification data (i.e., mobile device-specific information), e.g., an ID for the mobile phone, the date and/or time, an ID for the ATM 200, 250, or a random number, received from the mobile device 230. The signed data may be then included with the CA digital certificate provided to mobile device 230 by ATM 200, 250. This provides enables mobile device 230 to perform a further verification check (by ensuring that such information is properly signed) in order to verify that the received CA digital certificate is both genuine and up to date. In an alternative embodiment, the ATM CA digital certificate may be displayed as a QR code on the display 202, 252 for ATM 200, 250 and read by mobile device 230 using a QR reader module built into PIN entry application 235. This precludes man in the middle attacks between mobile device 230 and ATM 200, 250 because the ATM digital CA digital certificate is not transmitted via the communication channel between the mobile device 230 and ATM 200, 250.

A number of additional security features may be implemented in the present system and method. PIN entry application 235 may maintain a list of favorite ATMs (e.g., the last five ATMs visited) and store locally the ATM CA digital certificates from each of those ATMs. Since the ATM CA digital certificate is not transmitted via the communication channel when using one of these favorite ATMs, man in the middle attacks are precluded. PIN entry application 235 may upload an offline copy of the certificate ID to a monitoring station for the bank owner (financial institution) for verification after use. Further, PIN entry application may upload an online copy of the certificate ID to the monitoring station for real-time verification. PIN entry application 235 may maintain a log of all certificates used for use in tracking any discrepancy in any transaction involving the customer owner of mobile device 230. Finally, each ATM 200, 250 may maintain a log of all mobile devices 230 that connected to that ATM and transmitted a PIN thereto (whether or not the customer transaction was authorized).

Once the encryption key is verified, processing continues at step 325, where the customer's PIN is encrypted by PIN entry application 235. In a first embodiment, the PIN is first formatted into a PAN-less PIN block as specified in ISO 9564 (Financial services—Personal Identification Number (PIN) management and security). Next, PIN entry application 235 generates an ephemeral symmetric encryption key and encrypts the PAN-less PIN block using that ephemeral symmetric encryption key. Finally, PIN entry application 235 encrypts the ephemeral symmetric encryption key with the public key associated with the ATM CA digital certificate received from ATM 200, 250.

Figure 4:
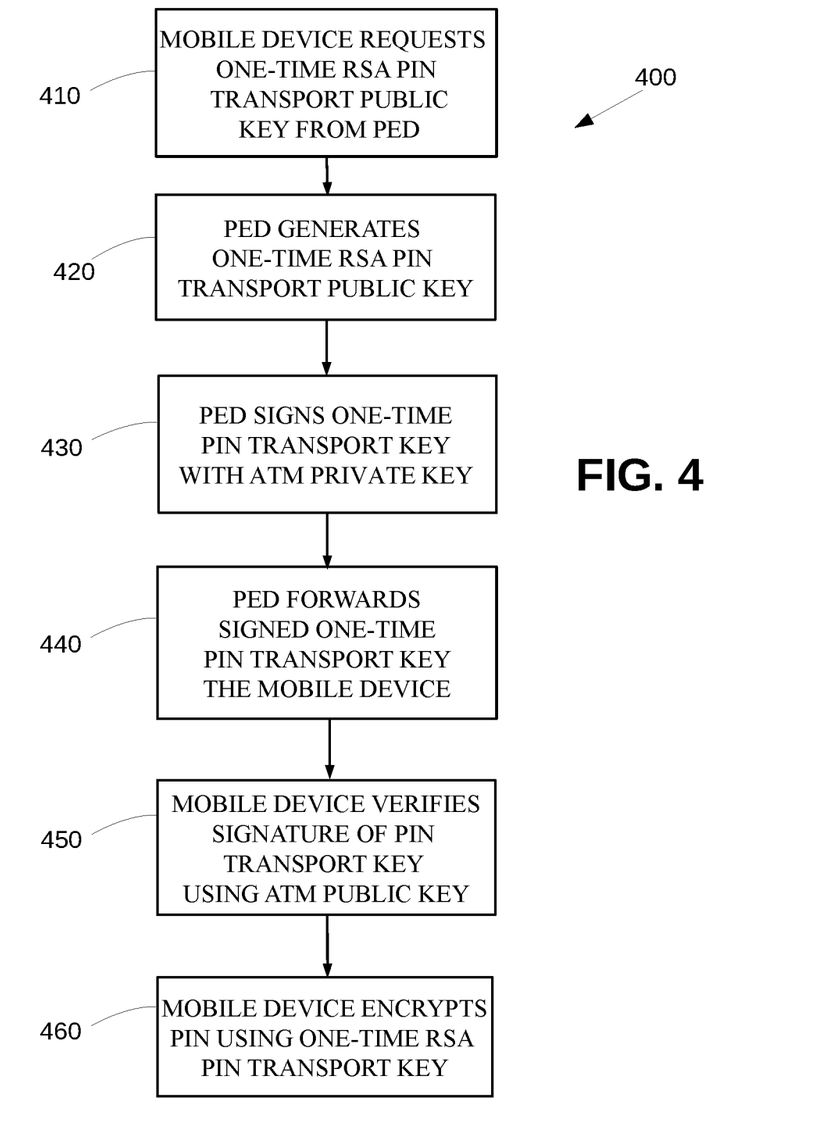
FIG. 4 is flowchart showing first aspects of a second embodiment of the method of FIG. 3.

In a second embodiment, as shown in the flowchart 400 in FIG. 4, mobile device 230, via PIN entry application 235, first requests a one-time RSA PIN transport public key from encrypting PIN pad module 204, 254 at step 410. Next, encryption processor 206, 256 generates a one-time RSA PIN transport public key at step 420. Encryption processor 206, 256 signs the one-time RSA PIN transport key with the ATM private key at step 430, and then forwards the signed one-time RSA PIN transport key to the mobile device 230 at step 440. The PIN entry application 235 in mobile device 230 verifies the signature of the one-time RSA PIN transport key using the ATM public key at step 450. Finally, the PIN entry application 235 in mobile device 230 encrypts the PIN using the one-time RSA PIN transport key at step 460.

After the PIN is encrypted at step 325, PIN entry application 235 transmits the encrypted PIN to ATM 200, 250 at step 330. In the first embodiment, PIN entry application 235 forwards both the encrypted PIN and the encrypted ephemeral symmetric encryption key to ATM 200, 250 via the communication channel established at step 310, where the encrypted PIN and the encrypted ephemeral symmetric encryption key are routed to encrypting PIN pad module 204, 254.

Figure 5:
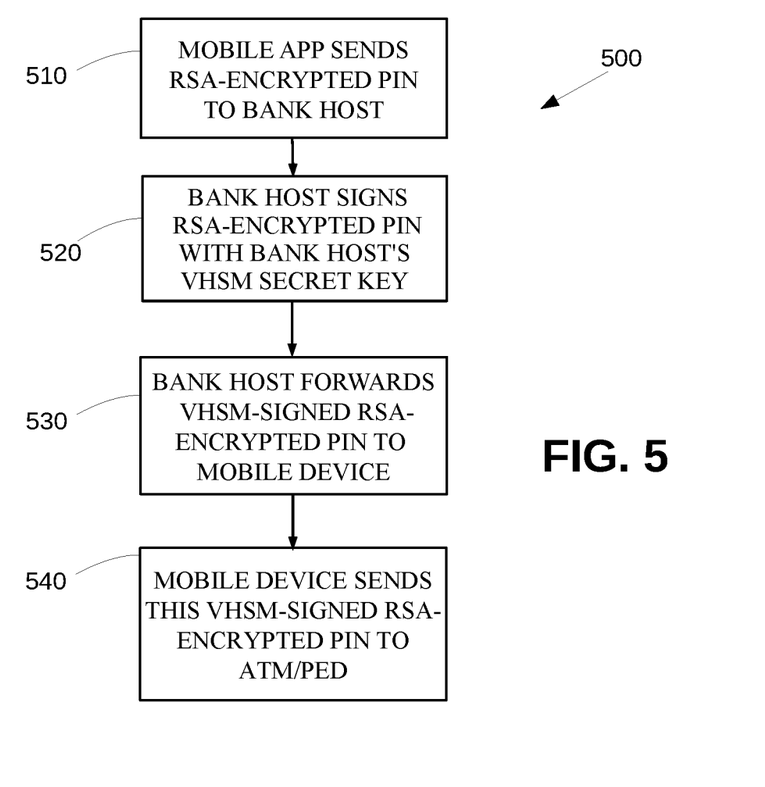
FIG. 5 is flowchart showing second aspects of the second embodiment of the method of FIG. 3.

In the second embodiment, as shown in the flowchart 500 of FIG. 5, mobile device 230 optionally first sends the RSA-encrypted PIN to the remote bank host 110 at step 510. This may be done via the secure communications channel with ATM 200, 250 or via a separate back channel using a wireless Internet or cellular data connection Upon receipt, the bank host signs the RSA-encrypted PIN with the bank host's virtual hardware security module (VHSM) secret key at step 520 and forwards the VHSM-signed RSA-encrypted PIN to mobile device 230 at step 530 (via the same communications channel). Finally, at step 540, PIN entry application 235 in mobile device 230 sends the VHSM-signed RSA-encrypted PIN to ATM 200, 250 for routing to encrypting PIN pad module 204, 254.

Figure 6:
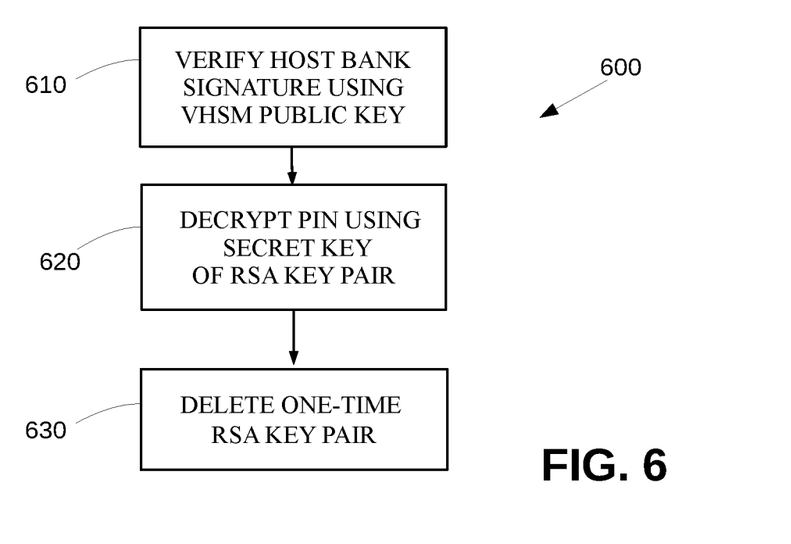
FIG. 6 is flowchart showing third aspects of the second embodiment of the method of FIG. 3.

Upon receipt of the encrypted PIN at encrypting PIN pad module 204, 254, encryption processor 206, 256 decrypts the PIN at step 335. In the first embodiment, this is done by first decrypting the encrypted ephemeral symmetric encryption key using the private key associated with the ATM's CA digital certificate. Once the ephemeral symmetric encryption key is decrypted, encryption processor 206, 256 uses the ephemeral symmetric encryption key to decrypt the PIN block. In the second embodiment, as shown in flowchart 600 in FIG. 6, encrypting PIN pad module 204, 254 first verifies host bank signature using the VHSM public key stored in encrypting PIN pad module 204, 254 at step 610 (if so signed). Once verified, encrypting PIN pad module 204, 254 decrypts the PIN using the secret key of RSA key pair at step 620. Finally, encrypting PIN pad module 204, 254 deletes the one-time RSA key pair at step 630.

Once the decrypted PIN is available at encrypting PIN pad module 204, 254, encryption processor 206, 256 formats the PIN and PAN into an appropriate PIN block according to ISO 9564 and then encrypts the PIN block using the stored encryption key 208, 258 in conventional manner at step 345.

In the last step 350, encrypting PIN pad module 204, 254 forwards the encrypted PIN block to the bank host for authorization. Thereafter, the customer can conduct normal transactions with ATM 200, 250 via an interface provided by PIN entry application 235 on mobile device 230.

The system shown in FIGS. 2A and 2B and the accompanying method of FIG. 3 allow PIN entry at a self-service terminal such as an ATM without the need for physical contact of any exposed surface of the ATM and provides an improved way for visually-impaired users to input their PIN without struggling to identify keys on the keypad via physical contact (e.g., by identifying and reading Braille characters on each key). This system and method employ one-time or ephemeral encryption keys for transmitting a customer's PIN from the mobile device to the ATM and does not require that symmetric encryption key 108 be duplicated outside the PIN entry device. As such, the system and method does not conflict with all applicable international security standards and security requirements currently documented by the Payment Card Industry and mandated by card brands. As can be seen by the description below, the system and method is compatible with existing banking infrastructure, can be easily implemented into existing ATMs with minor changes thereto, and can be used by any user having a mobile device including the PIN entry application (whether or not that user is a customer of the bank owning the ATM equipped with this system and method).

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A method for touchless entry of a personal identification number (PIN) to a self-service terminal, the self-service terminal including an interface for communicating wirelessly with a mobile device, comprising:
   reading a primary account number of a customer from a bank card of the customer via a card reader at the self-service terminal;
   establishing a wireless communication channel directly between a mobile device of the customer and a wireless interface included within an encrypting PIN pad module at the self-service terminal by scanning for and locating an open PIN entry application on the mobile device of the customer after reading the primary account number of the customer from the bank card of the customer at the self-service terminal;
   verifying a public key of the self-service terminal at the mobile device;
   formatting a PIN for the customer into a PIN-block that does not include the primary account number for the customer;
   encrypting only the PIN-block for the customer at the mobile device; and
   transmitting only the encrypted PIN-block from the mobile device to the self-service terminal;
   decrypting the encrypted PIN-block at the self-service terminal, and
   wherein the mobile device of the customer never receives or stores the primary account number of the customer.

2. The method of claim 1, further comprising generating an ephemeral symmetric encryption key at the mobile device.

3. The method of claim 2, further comprising encrypting the ephemeral symmetric encryption key using the public key at the mobile device.

4. The method of claim 3, further comprising transmitting the encrypted ephemeral symmetric encryption key to the self-service terminal.

5. The method of claim 4, further comprising decrypting the encrypted ephemeral symmetric encryption key at the self-service terminal using a private key of the self-service terminal, the private key corresponding to the public key of the self-service terminal.

6. The method of claim 5, wherein the PIN-block is encrypted using the ephemeral symmetric encryption key at the mobile device.

7. The method of claim 6, wherein the PIN is decrypted using the decrypted ephemeral symmetric encryption key at the self-service terminal.

8. The method of claim 1, wherein encrypting only the PIN-block at the mobile device comprises: requesting a one-time public key from the self-service terminal; receiving the one-time public key from the self-service terminal; and encrypting only the PIN-block using the one-time public key.

9. The method of claim 8, further comprising signing the one-time public key at the self-service terminal with a private key of the self-service terminal, the private key corresponding to the public key of the self-service terminal.

10. The method of claim 9, further comprising verifying the signature of the one-time public key at the mobile device using the public key of the self-service terminal prior to encrypting the PIN-block using the one-time public key.

11. The method of claim 8, wherein the PIN is decrypted using a private key corresponding to the one-time public key.

12. The method of claim 1, further comprising: transmitting mobile device-specific information from the mobile device to the self-service terminal; signing the mobile device-specific information with the private key at the self-service terminal and forwarding the signed mobile device-specific information to the mobile device; and verifying that the public key is up to date by verifying the signature of the mobile device- specific information received from the self-service terminal.

13. The method of claim 1, further comprising receiving the public key of the self-service terminal at the mobile device by reading a QR code version of the public key displayed on a display of the self-service terminal.

14. A method for touchless entry of a personal identification number (PIN) at a self-service terminal, the self-service terminal including a wireless interface for communicating wirelessly with a mobile device, comprising:
   reading a primary account number of a customer from a bank card of the customer via a card reader at the self-service terminal;
   establishing a wireless communication channel directly between the mobile device of the customer and the wireless interface included within an encrypting PIN pad module at the self-service terminal by scanning for and locating an open PIN entry application on the mobile device of the customer after reading the primary account number of the customer from the bank card of the customer at the self-service terminal;
   verifying a public key of the self-service terminal at the mobile device;
   formatting a PIN for the customer into a PIN-block that does not include a primary account number for the customer;
   encrypting only the PIN-block for the customer at the mobile device;
   transmitting the encrypted PIN-block to a host associated with the self-service terminal for signing the encrypted PIN;
   receiving the host-signed encrypted PIN-block at the mobile device;
   transmitting only the host-signed encrypted PIN-block from the mobile device to the self-service terminal;
   verifying the host signature of the host-signed encrypted PIN-block at the self-service terminal;
   decrypting the encrypted PIN-block at the self-service terminal, and
   wherein the mobile device of the customer never receives or stores the primary account number of the customer.

15. A system for touchless entry of a personal identification number (PIN), comprising:
   a mobile device of a customer, the mobile device including a PIN entry application, the PIN entry application never receiving or storing a primary account number of the customer;
   a self-service terminal comprising a central processing unit, a display, a card reader, a PIN entry device having an encryption processor, and a wireless interface included within an encrypting PIN pad module for communicating wirelessly with the mobile device to receive only an encrypted PIN and not a primary account number;
   wherein the PIN entry application is configured to verify a public key of the self-service terminal at the mobile device, format a PIN for the customer into a PIN-block that does not include a primary account number for the customer, encrypt only the PIN-block for the customer, and transmit only the encrypted PIN-block directly to the self-service terminal via the wireless interface on a wireless communication channel thereon established by scanning for and locating the PIN entry application on the mobile device of the customer after the primary account number of a customer is read from a bank card of the customer via a card reader at the self-service terminal; and wherein the encryption processor is configured to decrypt the encrypted PIN-block.

16. The system of claim 15, wherein the PIN entry application is configured to: generate an ephemeral symmetric encryption key;

encrypt the ephemeral symmetric encryption key using the public key; and transmit the encrypted ephemeral symmetric encryption key to the self-service terminal.

17. The system of claim 16, wherein the encryption processor is configured to decrypt the encrypted ephemeral symmetric encryption key at the self-service terminal using a private key of the self-service terminal, the private key corresponding to the public key of the self-service terminal.

18. The system of claim 17, wherein the PIN entry application is configured to encrypt the PIN-block using the ephemeral symmetric encryption key and wherein the encryption processor is configured to decrypt the PIN using the decrypted ephemeral symmetric encryption key.

19. The system of claim 15, wherein the PIN entry application is configured to request a one-time public key from the self-service terminal, receive the one-time public key from the self-service terminal, and encrypt the PIN-block using the one-time public key.

20. The system of claim 19, wherein the encryption processor is configured to decrypt the PIN using a private key corresponding to the one-time public key.

\* \* \* \* \*